United States Patent
Zhou et al.

(10) Patent No.: US 10,146,759 B2
(45) Date of Patent: Dec. 4, 2018

(54) CONTROLLING DIGITAL INPUT

(71) Applicant: Microsoft Technology Licensing, LLC, Redmond, WA (US)

(72) Inventors: Francis Zhou, Redmond, WA (US); Xiao Tu, Medina, WA (US); David W. Duhon, Redmond, WA (US); Silvano Bonacina, Redmond, WA (US); David Abzarian, Kenmore, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 149 days.

(21) Appl. No.: 15/193,851

(22) Filed: Jun. 27, 2016

(65) Prior Publication Data
US 2017/0277674 A1    Sep. 28, 2017

Related U.S. Application Data

(60) Provisional application No. 62/312,857, filed on Mar. 24, 2016.

(51) Int. Cl.
G06F 3/0488    (2013.01)
G06F 17/24    (2006.01)
G06F 3/0354    (2013.01)
G06F 3/14    (2006.01)
G06F 9/451    (2018.01)

(52) U.S. Cl.
CPC ........ G06F 17/242 (2013.01); G06F 3/03545 (2013.01); G06F 3/04883 (2013.01); G06F 3/1423 (2013.01); G06F 9/451 (2018.02)

(58) Field of Classification Search
CPC combination set(s) only.
See application file for complete search history.

(56) References Cited

U.S. PATENT DOCUMENTS 7,123,770 B2    10/2006    Raghupathy et al.
7,453,585 B2 *   11/2008    Dodge ................... G06F 3/038
                                                                    358/1.1

(Continued)

FOREIGN PATENT DOCUMENTS

EP    1538549    6/2005

OTHER PUBLICATIONS

"International Search Report and Written Opinion", Application No. PCT/US2017/023122, dated Jun. 19, 2017, 15 pages.

(Continued)

*Primary Examiner* — Van N Chow
(74) *Attorney, Agent, or Firm* — Fiala & Weaver P.L.L.C.

(57) ABSTRACT

A computing device includes a digital input system that allows freehand digital inputs to be received (e.g., via movement of a pen, stylus, finger, etc.). The digital input system provides functionality allowing applications to receive digital inputs from a user and control the display of data based on the digital inputs. The digital input system receives digital input from a user and analyzes the digital input to collect input data for the digital input. As the digital input is received, the input data is made available to an application, allowing the application to operate on the input data (e.g., modify the input data and/or generate additional input data) and provide the operated-on input data to the digital input system. The digital input system then proceeds to control the display of data based on the operated-on input data.

19 Claims, 10 Drawing Sheets

(56) References Cited

U.S. PATENT DOCUMENTS

| | | | |
|---|---|---|---|
| 7,696,998 | B2 | 4/2010 | Bae |
| 8,094,941 | B1 | 1/2012 | Rowley et al. |
| 8,116,570 | B2 | 2/2012 | Vukosavljevic et al. |
| 9,189,147 | B2 | 11/2015 | Asmi et al. |
| 9,411,508 | B2* | 8/2016 | Goldsmith .......... G06F 3/04883 |
| 9,524,440 | B2* | 12/2016 | Wimmer ............ G06K 9/00865 |
| 9,594,951 | B2* | 3/2017 | Bouaziz ............. G06K 9/00422 |
| 2004/0017946 | A1* | 1/2004 | Longe .................... G06F 3/018 |
| | | | 382/185 |
| 2004/0141646 | A1* | 7/2004 | Mahmoud Fahmy ...................... |
| | | | G06K 9/222 |
| | | | 382/187 |
| 2006/0274057 | A1 | 12/2006 | Van Ness et al. |
| 2006/0274943 | A1* | 12/2006 | Abdulkader ....... G06K 9/00429 |
| | | | 382/186 |
| 2013/0127910 | A1 | 5/2013 | Tijssen et al. |
| 2013/0307861 | A1 | 11/2013 | Lang et al. |
| 2014/0088926 | A1 | 3/2014 | Rhoades et al. |
| 2015/0205517 | A1 | 7/2015 | Feng et al. |

OTHER PUBLICATIONS

Caldwell, Serenity, "It's time to narrow down which device suits your sketching and handwriting needs", Published on: Dec. 2, 2015 Available at: http://www.imore.com/ipad-pro-vs-microsoft-surface-which-better-artists-and-writers-1.

Lazunov, Iaroslav, "Live Mirror Drawing in Illustrator", Published on: Oct. 29, 2013 Available at: http://vectips.com/tips-and-tricks/live-mirror-drawing-in-illustrator/.

"Creating an Ink Input Control", Retrieved on: Mar. 11, 2016 Available at: https://msdn.microsoft.com/library/ms752334(v=vs.100).aspx.

Ponder, George, "Sketchable, a feature rich drawing app for Windows 8", Published on: Dec. 8, 2014 Available at: http://www.windowscentral.com/sketchable-feature-rich-drawing-app-windows-8.

Song, et al., "PenLight: combining a mobile projector and a digital pen for dynamic visual overlay", In Proceedings of SIGCHI Conference on Human Factors in Computing Systems, Apr. 4, 2009, pp. 143-152.

"Editing Shapes", Retrieved on: Mar. 11, 2016 Available at: http://www.sketchapp.com/learn/documentation/04-shapes/1-editing.html.

\* cited by examiner

CONTROLLING DIGITAL INPUT

RELATED APPLICATIONS

This application claims priority under 35 U.S.C. Section 119(e) to U.S. Provisional Application No. 62/312,857, filed Mar. 24, 2016 and titled "Controlling Digital Input", the entire disclosure of which is hereby incorporated by reference.

BACKGROUND

Devices today (e.g., computing devices) typically support a variety of different input techniques. For instance, a particular device may receive input from a user via a keyboard, a mouse, voice input, touch input (e.g., to a touchscreen), and so forth. One particularly intuitive input technique enables a user to utilize a touch instrument (e.g., a pen, a stylus, a finger, and so forth) to provide freehand input to a touch-sensing functionality such as a touchscreen. The freehand input may be converted to a corresponding visual representation on a display, such as for taking notes, for creating and editing an electronic document, and so forth.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a digital input is received by a digital input system, the receiving including collecting input data for the digital input that describes the digital input. The input data for the digital input is provided, by the digital input system, to a host application as the digital input is received. An indication of one or more operations that the host application performed on the input data is received from the host application, and the digital input system controls, as the digital input is received, a display of data based at least in part on the operated-on input data.

In accordance with one or more aspects, a computing device includes an input data collection module, an input manager, and a data display module. The input data collection module comprises instructions configured to collect input data for a digital input that is input to the computing device. The input manager comprises instructions configured to provide the input data to a host application as the digital input is received, and to receive from the host application an indication of the digital input as operated on by the host application. The data display module comprises instructions configured to communicate with the input manager and to display data based on the digital input as operated on by the host application.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
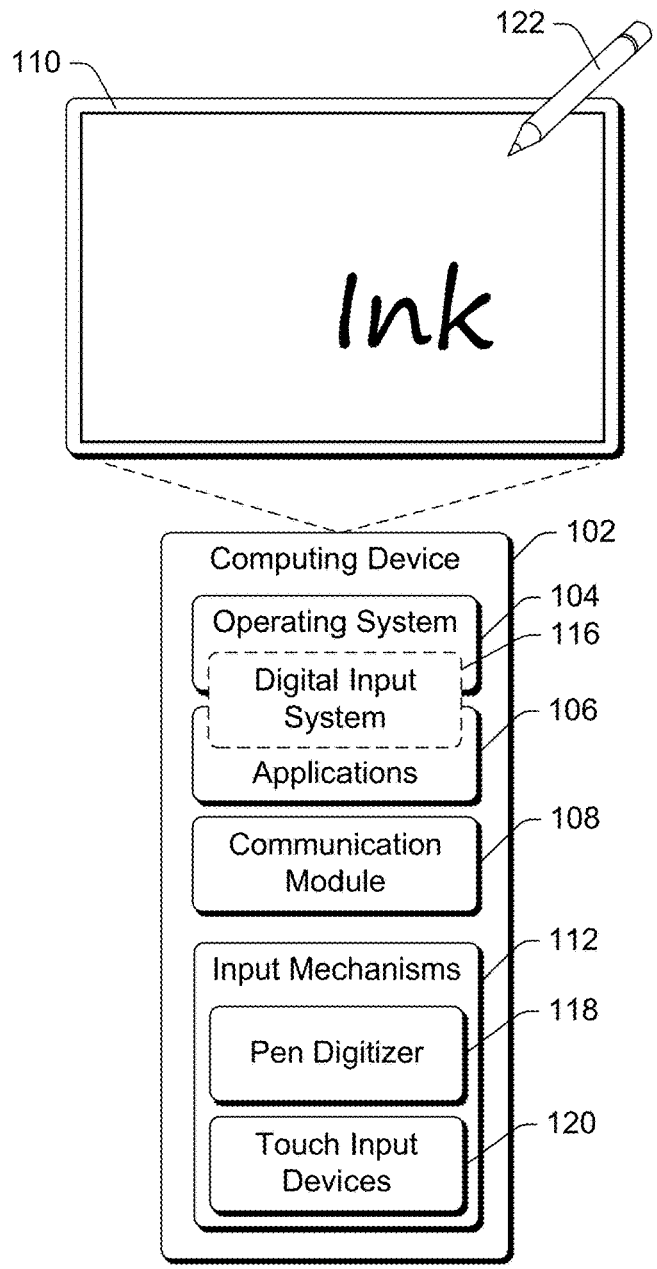
FIG. 1 illustrates an example environment in which the controlling digital input discussed herein can be used.

Controlling digital input is discussed herein. A computing device includes a digital input system that provides digital input functionality for the computing device. The digital input system can be implemented as part of an application, as a standalone application that provides digital input support to other applications (referred to herein as host applications), or combinations thereof. Digital inputs may be provided in various ways, such as using a pen (e.g., an active pen, a passive pen, and so forth), a stylus, a finger, and so forth. The digital inputs discussed herein are provided by movement of an input device (e.g., stylus, pen, finger, mouse, etc.) in a freehand manner and thus can also be referred to as freehand digital inputs. The digital input system provides functionality allowing applications to receive digital inputs from a user of the computing device, store received digital inputs, and control the display of data based on the digital inputs.

Various different types of digital inputs can be supported by the digital input system. In one or more embodiments, the digital input system supports digital ink that can be displayed on a display device. Generally, digital ink refers to freehand input to a touch-sensing device such as a touchscreen, which is interpreted by the computing device as digital ink (or simply "ink"). Additionally or alternatively, the digital input system supports other types of digital inputs, such as digital input to erase or delete a portion of data previously input, digital input to control a direction of movement (e.g., a route or path for a vehicle to take, a route or path for a game), and so forth.

The digital input system receives digital input from a user and analyzes the digital input to collect input data for the digital input. This input data refers to various information describing the digital input, such as the coordinates on the input device where the digital input occurred and pressure information indicating an amount of pressure applied at each of those coordinates for the digital input. A digital input refers to the movement of the input device (e.g., a pen, stylus, finger, etc.) along an input surface from a beginning location (e.g., where the input device is brought into contact with the input surface) to an ending location (e.g., where the input device is pulled away from the input surface).

As the digital input is received, the input data is made available to a host application if the host application desires the input data. The host application can then act or operate on the input data in any of a variety of different manners, and return the input data (optionally modified) to the digital input system. The digital input system then proceeds to control the display of data based on the operated-on input data. This controlling of the display of data can be, for example, displaying digital ink corresponding to the input data, erasing data based on the input data, determining movement of an object based on the input data, and so forth. For example, the host application can change the input data, such as changing the coordinates where the digital input occurred (e.g., to keep the digital input along a straight edge), and return the changed input data to the digital input system (e.g., for display). By way of another example, the host application can create new input data for a new digital input (e.g., that mirrors the digital input) and provide the new input data to the digital input system. The digital input system can then control or manipulate data based on both the digital input and the new digital input (e.g., by displaying both the new input data as well as the input data received as part of the digital input). By way of another example, the host application can create new input data for a new digital input (e.g., that projects the digital input onto a different screen or display) and provide the new input data to the digital input system (e.g., which displays both the new input data as well as the input data received as part of the digital input).

Thus, the host application can act upon the digital input as the input is being received. The techniques discussed herein allow, for example, the host application to ensure that the input data reflects digital input along a ruler, protractor, or other edge, providing smooth digital input rather than wobbly or wiggly lines as might be drawn freehand by the user. The techniques discussed herein also allow, for example, a mirror image for the digital input to be created (e.g., the other half of a heart being drawn by the user) and/or to have a duplicate of the digital input displayed on a remote display (e.g., another screen or display device that the computing device implementing the digital input system is projecting the digital input to).

The techniques discussed herein provide a robust and user friendly experience with digital inputs. Various different host applications can leverage the digital input system to support digital inputs. The host application is able to act upon the digital input as the digital input is being made—the host application need not wait for a digital input to be completed to act upon the digital input. Thus, the digital input is acted upon in real time as the digital input is made (e.g., as the user draws a digital input, the digital input is mirrored, the digital input is modified so as to be smooth along a straight edge, etc.).

FIG. 1 illustrates an example environment 100 in which the controlling digital input discussed herein can be used. The environment 100 includes a computing device 102 that can be embodied as any suitable device such as, by way of example, a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet), an entertainment device (e.g., an entertainment appliance, a set-top box communicatively coupled to a display device, a game console), an Internet of Things (IoT) device (e.g., objects or things with software, firmware, and/or hardware to allow communication with other devices), a television or other display device, an automotive computer, and so forth. Thus, the computing device 102 may range from a full resource device with substantial memory and processor resources (e.g., personal computers, game consoles) to a low-resource device with limited memory and/or processing resources (e.g., traditional set-top boxes, hand-held game consoles).

The computing device 102 includes a variety of different functionalities that enable various activities and tasks to be performed. For instance, the computing device 102 includes an operating system 104, multiple applications 106 (also referred to herein as host applications), and a communication module 108. Generally, the operating system 104 is representative of functionality for abstracting various system components of the computing device 102, such as hardware, kernel-level modules and services, and so forth. The operating system 104, for instance, can abstract various components of the computing device 102 to the applications 106 to enable interaction between the components and the applications 106.

The applications 106 represent functionalities for performing different tasks via the computing device 102. Examples of the applications 106 include a word processing application, an information gathering and/or note taking application, a spreadsheet application, a web browser, a gaming application, and so forth. The applications 106 may be installed locally on the computing device 102 to be executed via a local runtime environment, and/or may represent portals to remote functionality, such as cloud-based services, web apps, and so forth. Thus, the applications 106 may take a variety of forms, such as locally-executed code, portals to remotely hosted services, and so forth.

The communication module 108 is representative of functionality for enabling the computing device 102 to communicate over wired and/or wireless connections. For instance, the communication module 108 represents hardware and logic for communication via a variety of different wired and/or wireless technologies and protocols.

The computing device 102 further includes a display device 110, input mechanisms 112, and a digital input system 116. The display device 110 generally represents functionality for visual output for the computing device 102. Additionally, the display device 110 optionally represents functionality for receiving various types of input, such as touch input, pen input, and so forth. The input mechanisms 112 generally represent different functionalities for receiving input to the computing device 102. Examples of the input mechanisms 112 include gesture-sensitive sensors and devices (e.g., such as touch-based sensors and movement-tracking sensors (e.g., camera-based)), a mouse, a keyboard, a stylus, a touch pad, accelerometers, a microphone with accompanying voice recognition software, and so forth. The input mechanisms 112 may be separate or integral with the display 110; integral examples include gesture-sensitive displays with integrated touch-sensitive or motion-sensitive sensors. The input mechanisms 112 optionally include a pen digitizer 118 and/or touch input devices 120. The pen digitizer 118 represents functionality for converting various types of input to the display device 110 and/or the touch input devices 120 into digital data that can be used by the computing device 102 in various ways, such as for generating digital ink. The touch input devices 120 represent functionality for providing touch input separately from the display 110.

Although reference is made herein to the display device 110 receiving various types of input such as touch input or pen input, alternatively the display device 110 may not receive such input. Rather, a separate input device (e.g., a touchpad) implemented as a touch input device 120 can receive such input. Additionally or alternatively, the display device 110 may not receive such input, but a pen (such as pen 122) can be implemented as a touch input device 120, and the pen provides an indication of the input rather than the input being sensed by the display device 110.

According to various implementations, the digital input system 116 represents functionality for performing various aspects of the techniques for controlling digital input discussed herein. Various functionalities of the digital input system 116 are discussed herein. In one or more embodiments, the digital input system 116 is implemented as an application 106 (or as part of the operating system 104) that provides digital input support to other applications 106 (or programs of the operating system 104). The digital input system 116 optionally includes an application programming interface (API) allowing the applications 106 or other programs to interact with the functionality provided by the digital input system 116. Alternatively, the digital input system 116 can be implemented in an application 106 and provide digital input support for that application 106 but not for other applications 106. Alternatively, the digital input system 116 can be implemented as a combination thereof. For example, some functionality of the digital input system 116 can be implemented in an application 106 (or as part of the operating system 104) that provides digital input support to other applications 106 or programs, and other functionality of the digital input system 116 can be implemented in the individual applications 106 to which the digital input system 116 provides support.

The environment 100 further includes a pen 122, which is representative of an input device for providing input to the display device 110. Generally, the pen 122 is in a form factor of a traditional pen but includes functionality for interacting with the display device 110 and other functionality of the computing device 102. In at least some implementations, the pen 122 is an active pen that includes electronic components for interacting with the computing device 102. The pen 122, for instance, includes a battery that can provide power to internal components of the pen 122. Alternatively or additionally, the pen 122 may include a magnet or other functionality that supports hover detection over the display device 110. This is not intended to be limiting, however, and in at least some implementations the pen 122 may be passive, e.g., a stylus without internal electronics.

Digital input can be provided by the user using the pen 122. Additionally or alternatively, digital input can be provided by the user using other input mechanisms, such as the user's finger, a stylus, and so forth.

In one or more embodiments, the digital input system 116 maintains the digital input in a vector format. Various different vector formats can be used, such as a Scalable Vector Graphics (SVG) format. Thus, in contrast to systems that maintain digital input in a bitmap format, the individual digital inputs (optionally as modified by an application 106 as discussed in more detail below) are maintained in a vector format. The digital inputs can optionally be saved by the computing device 102. The digital inputs can be stored in a digital input store (e.g., a storage device local to the computing device 102 and/or accessed via a network) by the digital input system 116 and/or the applications 106. The digital inputs can be saved in various different types of files, such as an Ink Serialized Format (ISF) file, an eXtensible Markup Language (XML) file, a HyperText Markup Language (HTML) file, and so forth.

Figure 2:
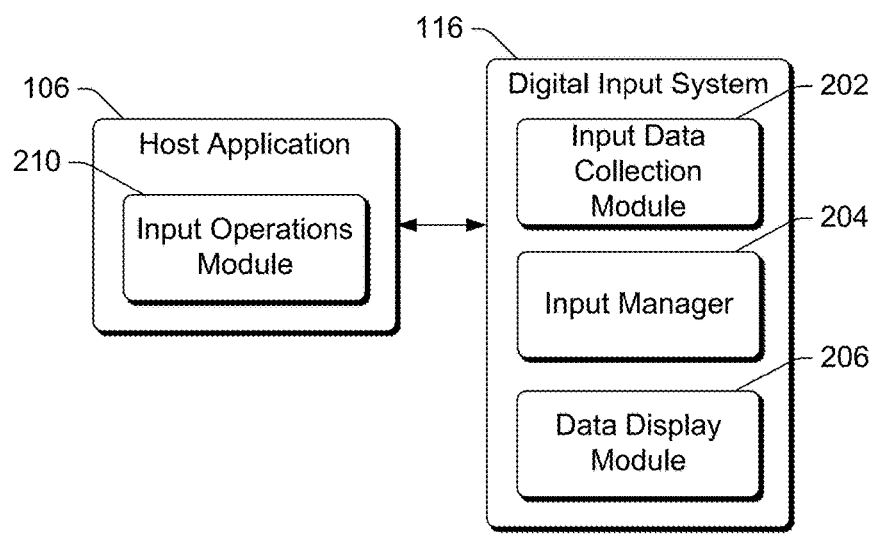
FIG. 2 illustrates an example system including a host application and digital input system in accordance with one or more embodiments.

FIG. 2 illustrates an example system 200 including a host application and digital input system in accordance with one or more embodiments. FIG. 2 is discussed with reference to elements of FIG. 1. The digital input system 116 includes an input data collection module 202, an input manager 204, and a data display module 206. The digital input system 116 communicates with an input operations module 210 of the host application 106, which performs various operations based on the input data as discussed in more detail below.

The input data collection module 202 collects input data for digital inputs (e.g., to the computing device 102). A digital input is described using various information referred to as input data (also referred to as digital input data). In one or more embodiments, the input data includes a set of coordinates and optionally pressure applied at each coordinate. The coordinates can be in various coordinate systems, such as a 2-dimensional Cartesian coordinate system, a polar coordinate system, and so forth. The pressure or force can be measured in various units, such as pascals. The coordinates and optionally pressure can be sensed by various sensors of the touch input devices 120 (e.g., sensors in the display device 110, sensors in the pen 122, and so forth). The input data can additionally or alternatively include other data, such as an angle or tilt of the input device, a shape of the input device (e.g., in contact with a touchscreen), and so forth.

The coordinates included in the input data are a set or series of coordinates that identify the location of the input mechanism at particular times as the digital input is being provided by the user. These particular times can be regular or irregular intervals (e.g., every 10 milliseconds). The coordinates are detected or sensed by the pen digitizer 118 or a touch input device 120, such as by the display device 110, by the pen 122, and so forth. Using the example of the digital ink input of "Ink" in FIG. 1, the ink stroke data for the digital ink input is the coordinates that identify the location of the input mechanism as the letter "I" is written, as the letter "n" is written, and as the letter "k" is written. In one or more embodiments, as used herein an input refers to the movement of the input device from being first sensed as providing input (e.g., touching a touchscreen device or a "pen down" event) through the input device no longer being sensed as providing input (e.g., the input device being lifted away from the touchscreen device or a "pen up" event). In situations in which the digital input is digital ink, the input can also be referred to as a digital ink stroke, and the input data can also be referred to as digital ink stroke data.

The input manager 204 determines the appropriate manner to control or manipulate data displayed by the computing device 102. This data displayed by the computing device 102 can be data showing the digital input (e.g., digital ink that is input by the user), or other data that is shown and manipulated based on the digital input (e.g., erasing of previously input digital ink, display of an icon or character, etc.). The data displayed is based on the both the digital input that is input and one or more operations performed on the input data by the input operations module 210.

The input manager 204 receives the input data from the input data collection module 202 and notifies the input operations module 210 of the received input data. In one or more embodiments, the input operations module 210 registers with the input manager 204 to receive particular events regarding digital input, such as when an input begins, when an input ends, input data collected during the input, and so forth. Whenever one of these registered-for events occurs, the input manager 204 notifies the input operations module 210 of the input data at the time the event occurs. This notification can be performed in various manners, such as by invoking an API method or callback function of the input operations module 210.

Additionally or alternatively, the input operations module 210 can be notified of input data in other manners. For example, the input manager 204 can notify the input operations module (e.g., by invoking an API method or callback function of the input operations module 210) of collected input data regardless of which (if any) events the input operations module 210 has registered for. By way of another example, the input manager 204 can issue a message (e.g., via a messaging system of the operating system 104) indicating the input data collected, and input operations module 210 can choose whether to receive such messages (or choose to receive all such messages and then determine what, if any, action to take on the messages).

The input operations module 210 operates on the input data, and provides an indication to the input manager 204 of the operated-on input data. This indication can be a change to the input data received from the input manager 204 and/or additional input data to be used by the input manager 204.

The input operations module 210 operates on the input data provided by the input manager 204. The input operations module 210 can operate on the input data in a variety of different manners, such as modifying the input data, generating additional input data, and so forth. The manner in which the input operations module 210 operates on the input data can vary based on the desires of the developer of the host application 106 and/or the user of the host application 106.

In one or more embodiments, the input operations module 210 modifies the input data based on a stencil. Various different stencils can be used, such as a ruler, a protractor, a circle, a French curve, and so forth. A "soft" stencil is used (and optionally displayed) by the host application 106, the soft stencil referring to a stencil that is generated and displayed by the host application 106 (or other program running on the computing device 102) in contrast to a physical stencil available to a user of the host application 106. The soft stencils can be available from the host application 106, the digital input system 116, and/or other programs of the computing device 102. For example, a library of soft stencils can be maintained and the user of the host application 106 can select a desired soft stencil to use for the digital input.

Freehand digital input is often wiggly or wobbly rather than a straight line, and the soft stencil allows the user to generate digital input that conforms to the shape of the edge of the stencil rather than the wiggly or wobbly digital input. For example, the stencil can be a ruler, and the input operations module 210 modifies the input data so that the input data indicates locations (e.g., coordinates) along the edge of the ruler. By way of another example, the stencil can be a ruler that is used as a mask, so that digital input in an area where the stencil is displayed is masked (and thus is not displayed by the digital input system 116) but digital input in an area where the stencil is not displayed is not masked (and thus is displayed by the digital input system 116).

Additionally or alternatively, the input data can be modified in various other manners. For example, the data indicating pressure applied by the input device can be changed, an angle or tilt of the input device can be changed, a shape of the input device (e.g., in contact with a touchscreen) can be changed, and so forth.

In one or more embodiments, the input operations module 210 generates additional input data. This additional input data can be, for example, input data that mirrors the digital input about one or more axes or lines (e.g., a vertical axis or a horizontal axis). For example, the user may desire to draw a heart shape and provide digital input that is the right half of the heart shape. The input operations module 210 generates additional input data that corresponds to the input data for the right half of the heart shape and generates additional input data for the left half of the heart shaped.

Additionally or alternatively, this additional input data can be input data that corresponds to the input data of the digital input but is relative to a different one or more lines (or axes) input or selected by the user. For example, the user may desire to draw a first straight line and have a second straight line drawn perpendicular to the first straight line. The input operations module 210 generates additional input data that corresponds to the input data for the first straight line, but is a second straight line perpendicular to the first straight line (e.g., beginning where the first straight line begins or at some other location specified by the user).

Additionally or alternatively, this additional input data can be input data that is for one or more additional displays. For example, the host application 106 may facilitate projection of data from the computing device 102 to another display (e.g., the computing device 102 may be a tablet or smartphone, and the host application 106 may facilitate projection of data from the tablet or smartphone to a larger television or monitor). In this situation, the additional input data is additional input data indicating data to be displayed on one or more additional displays in addition to (or rather than) the data to be displayed on a display device of the computing device 102.

The input operations module 210 provides the operated-on input data to the input manager 204. The input manager 204 receives the operated-on input data from the input operations module 210 and determines how to control the display of the digital input based on the operated-on input data. This determination is based at least in part on the operated-on input data received from the input operations module 210. In situations in which the input operations module 210 modifies the input data, the input manager 204 controls display of data based on the operated-on input data (the modified input data) rather than the input data received from the input data collection module 202. In situations in which additional input data is generated by the input operations module 210, the input manager 204 controls display of data based on the additional input data rather than (or alternatively in addition to) the input data received from the input data collection module 202. The input manager 204 treats the additional input data it receives from the input operations module 210 as if it were any other digital input (e.g., as if the additional input data were received from an input device rather than having been generated by the input operations module 210).

The input manager 204 communicates with the data display module 206 to display data based on the digital input as appropriate. The data display module 206 displays data as indicated by the input manager 204, and can display data on a single display, multiple displays, and so forth. Thus, the data displayed by the data display module 206 reflects the input data as operated on by the input operations module 210.

It should be noted that the input data that is operated on by the input operations module 210 can be managed in different manners. In one or more embodiments, the input manager 204 provides or otherwise makes available to the input operations module 210 a copy of the collected input data. The input operations module 210 operates on the copy and then the input manager 204 updates the collected input data to incorporate any modifications made to the input data by the input operations module 210 (optionally maintaining a backup copy or record of the un-modified input data for later use if desired). Alternatively, the input manager 204 can provide the collected input data to the input operations module 210, allowing the input operations module 210 to modify the collected input data rather than a copy of the collected input data.

In one or more embodiments, as part of generating additional input data, the input operations module 210 optionally provides additional instruction or information regarding the additional input data to the input manager 204. This additional instruction or information can specify, for example, whether to render the additional input data immediately or after some delay, which of multiple instances of data display module 206 to have display the additional input data, and so forth.

It should be noted that the data display module 206 can display data based on the digital input in various manners, and that new data is not necessarily displayed. For example, the digital input can be to erase at least part of a previous input (e.g., erase previously input digital ink), including erasing previous input as modified by the input operations module 210. The digital input system 116 also supports various additional operations on digital inputs and treats digital inputs that have been operated on by the input operations module 210 as if they were any other digital inputs, including saving the input data, allowing the digital input (e.g., digital ink) to be copied and/or pasted, and so forth.

FIGS. 3-8 illustrate examples of controlling digital input using the techniques discussed herein in accordance with one or more embodiments. FIGS. 3-8 are discussed with reference to elements of FIGS. 1 and 2.

Figure 3:
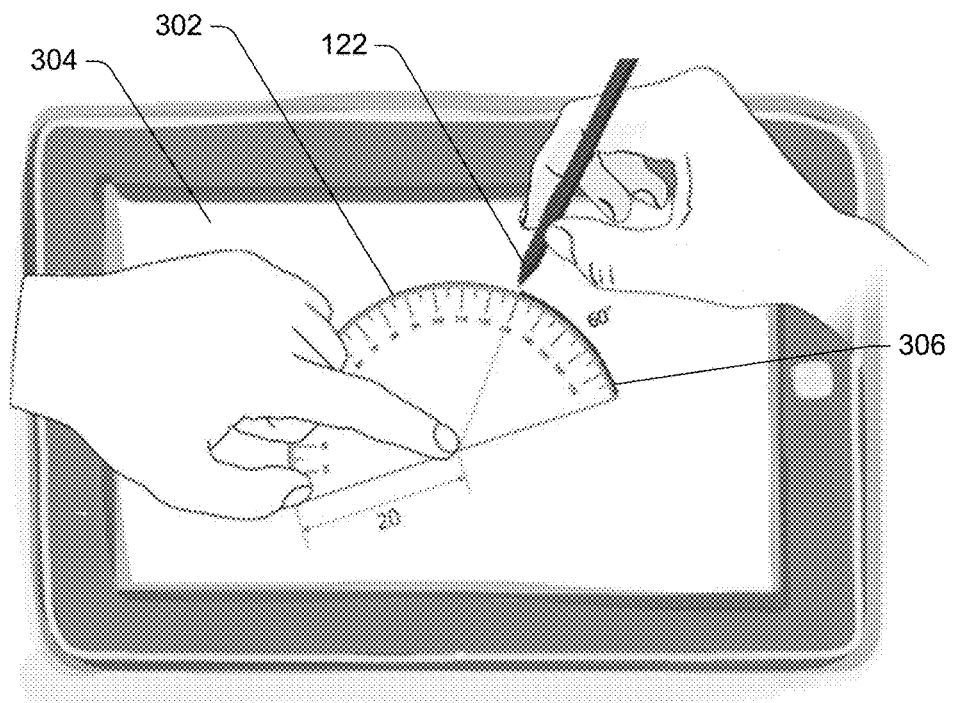
FIGS. 3, 4, 5, 6, 7 and 8 illustrate examples of controlling digital input using the techniques discussed herein in accordance with one or more embodiments.

FIG. 3 illustrates an example 300 in which digital ink is generated along the edge of a stencil. In the example 300, a user desires to input digital ink that is an arc along the edge of a soft stencil 302. A pen 122 is used to provide a digital input on a touchscreen display 304, but due to the wiggly or wobbly nature of the freehand input with the pen 122 without alteration the digital ink input by the user would be a wiggly or wobbly arc rather than a smoothly drawn arc along the edge of the soft stencil 302. The input operations module 210 modifies the digital input from the pen 122, modifying the input data so that the modified input data is a smooth arc along the edge of the stencil 302. The input manager 204 uses this modified input data to have the data display module 206 display the smooth arc 306.

Figure 4:
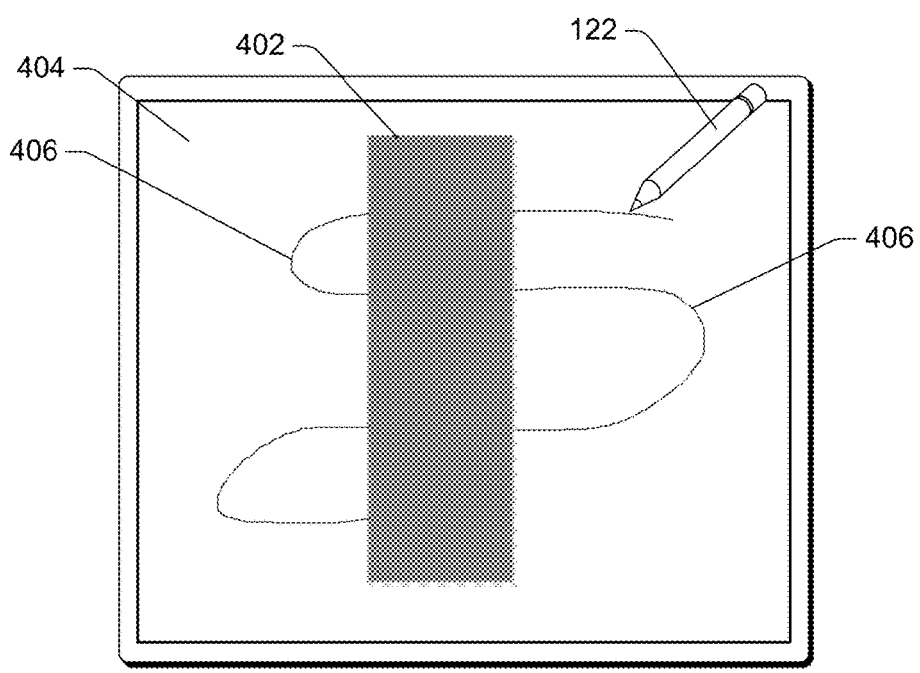

FIG. 4 illustrates an example 400 in which digital ink is generated and a stencil is used to mask part of the digital input. In the example 400, a user desires to input digital ink that is freeform digital ink that is not displayed in the area in which a soft stencil 402 is located. A pen 122 is used to provide a digital input on a touchscreen display 404, and the input operations module 210 modifies the digital input from the pen 122 so that input data for the digital input at locations (e.g., coordinates) at which the soft stencil 402 is present (e.g., overlaps the input data) is not displayed. The input operations module 210 can separate the digital input into multiple different digital inputs, can delete or otherwise drop the input data for locations at which the soft stencil 402 is present, or modify the input data to include an indicator to the input manager 204 that the input data for the locations at which the soft stencil 402 is present is not to be displayed. The input manager 204 uses this modified input data to have the data display module 206 generate the digital ink 406, which is the freeform digital input provided by the user masked by the soft stencil 402.

Figure 5:
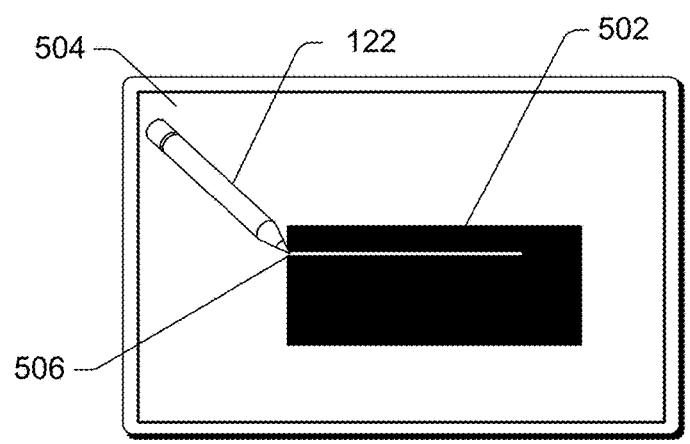

FIG. 5 illustrates an example 500 in which a digital input is used to erase data. In the example 500, a user desires to erase data along a straight line from previously input digital ink 502. A pen 122 is used to provide a digital input on a touchscreen display 504, but due to the wiggly or wobbly nature of the freehand input with the pen 122 without alteration the digital input by the user would be a wiggly or wobbly line rather than a smoothly drawn straight line. The input operations module 210 modifies the digital input from the pen 122, modifying the input data so that the modified input data is a smooth straight line along the edge of a straight edge soft stencil (not shown). The input manager 204 uses this modified input data to have the data display module 206 erase a smooth straight line 506 from the previously input digital ink 502.

Figure 6:
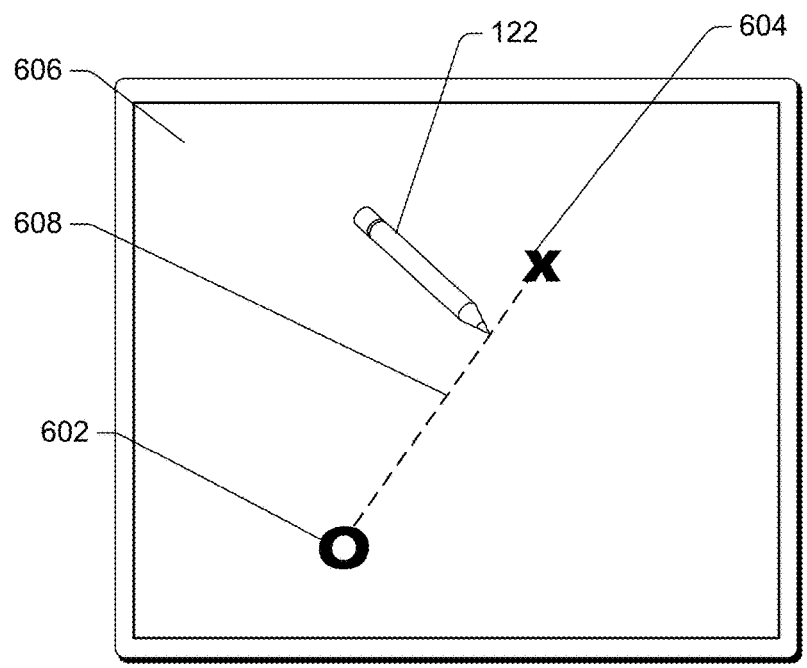

FIG. 6 illustrates an example 600 in which a digital input is used to set a route. In the example 600, a user desires to set a route along a straight line from a starting location 602 to a destination location 604. A pen 122 is used to provide a digital input on a touchscreen display 606, but due to the wiggly or wobbly nature of the freehand input with the pen 122 without alteration the digital input by the user would be a wiggly or wobbly line rather than a smoothly drawn straight line. The input operations module 210 modifies the digital input from the pen 122, modifying the input data so that the modified input data is a smooth straight line along the edge of a straight edge soft stencil (not shown). This modified input data is used to generate a smooth straight line 608 from the starting location 602 to the destination location 604. The input manager 204 optionally uses this modified input data to have the data display module 206 draw the line 608. Additionally or alternatively, the host application 106 can use the modified input data to generate the route along the smooth straight line 608, and need not have the line 608 displayed. The route can be used for various different purposes as desired by the host application 106, such as to move icons or characters in a game, to set a path for a vehicle (e.g., a drone), and so forth.

Figure 7:
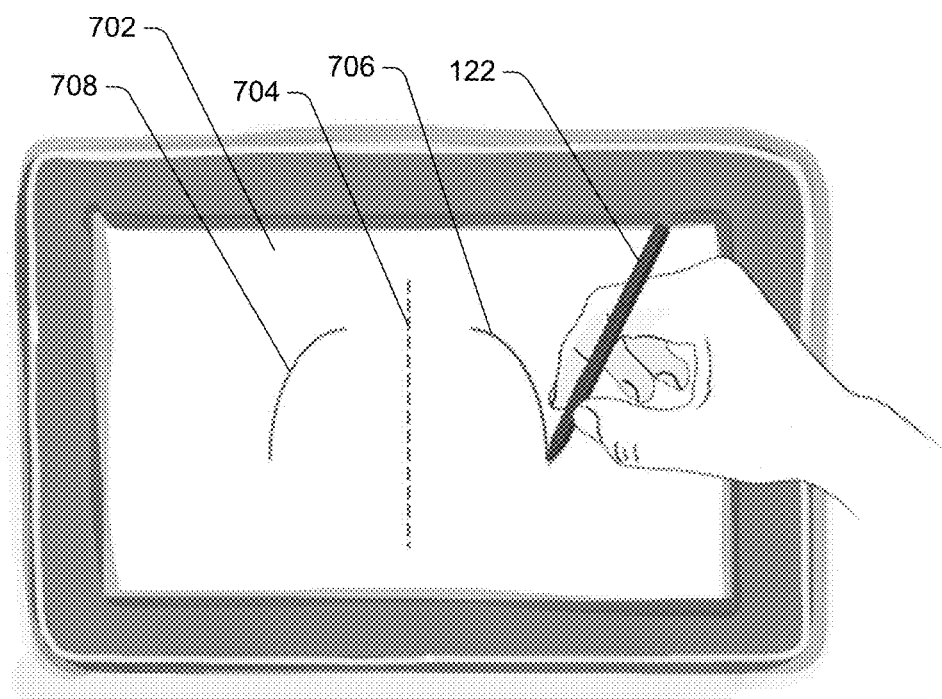

FIG. 7 illustrates an example 700 in which additional digital ink is generated. In the example 700, a user desires to input digital ink and have additional digital ink generated that is a mirror along of the input digital ink. A pen 122 is used to provide a digital input on a touchscreen display 702. The input operations module 210 generates additional input data that is a mirror of the input data for the input digital ink along an axis 704 (e.g., which can be input or otherwise selected by the user). The input operations module 210 provides the additional input data to the input manager 204, which uses the input data for the digital input provided by the user to have the display module 206 display the digital input 706 and uses the additional input data to have the display module 206 display an additional line 708 that mirrors the digital input 706 about the axis 704. The input data is provided to the input operations module 210 as the input data is received by the input manager 204, and the additional input data is returned to the input manager 204 as the input data is operated on. Thus, the additional input data can be used to generate and display the additional line 708 contemporaneously with the collected input data being used to generate and display the digital input 706.

Figure 8:
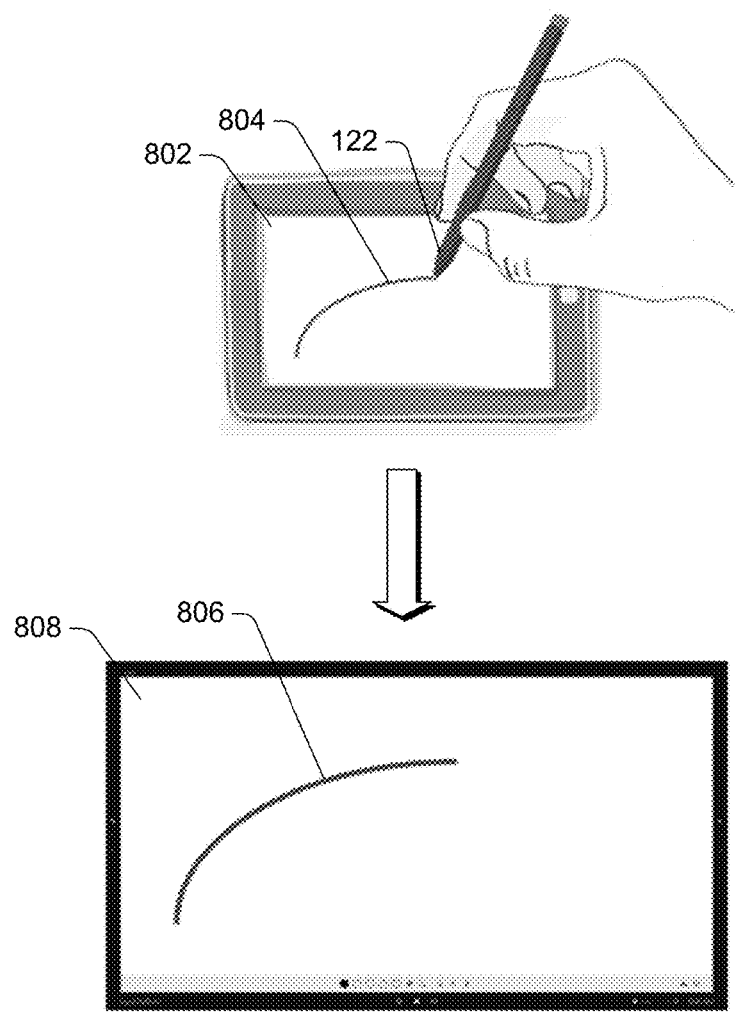

FIG. 8 illustrates an example 800 in which additional digital ink is generated. In the example 800, a user desires to input digital ink and have additional digital ink generated that is displayed on an additional display device. A pen 122 is used to provide a digital input on a touchscreen display 802. The input operations module 210 generates additional input data that is the same as (e.g., a duplicate of) the input data but uses the additional input data to project the digital input onto a display for a different display device, and provides the additional input data to the input manager 204. The input manager 204 uses the input data for the digital input provided by the user to have the display module 206 display the digital input 804 on the display 802. The input manager 204 uses the additional input data to have the display module 206 display an additional line 806 on an additional display 808. The additional line 806 can be displayed on the additional display 808 in various different manners. In one or more embodiments, the digital input system 116 includes multiple data display modules 206, one for each display device on which digital inputs are displayed (e.g., one data display module for the display 802, and one data display module for the additional display 808). These multiple data display modules can be, for example, different instances of the data display module 206 within a process, or different instances of the data display module 206 in different processes. In such situations, the input manager 204 communicates with both of the data display modules to display the input data on the display 802 as line 804 and the additional input data on the display 808 as line 806. The input data is provided to the input operations module 210 as the input data is received by the input manager 204, and the additional input data is returned to the input manager 204 as the input data is operated on. Thus, the additional input data can be used to generate and display the additional line 806 contemporaneously with the collected input data being used to generate and display the digital input 804.

Additionally or alternatively, the input operations module 210 generates additional input data that is based on the input data but is not the same as (e.g., is not a duplicate of) the input data. For example, the additional input data can be a mirror of the input data (analogous to the discussion above regarding FIG. 7).

Returning to FIG. 2, in one or more embodiments the input operations module 210 and the input manager 204 are implemented at least in part in software or firmware, and at least part of the input operations module 210 is executed in a same thread as the input manager 204. This allows, for example, modifications to the input data to be made as the input data is received, with little or no user-perceivable delay between moving the input device and the modified input data being displayed. In one or more embodiments, the notification of the events and the modifications of the input data are performed synchronously—the input manager 204 does not proceed with having the data display module 206 change the display (e.g., display a portion of an input digital ink stroke) until the input operations module 210 has had the opportunity to operate on the input data.

It should be noted that not all of the input operations module 210 need be implemented in the same thread as the input manager 204. In one or more embodiments, portions of the input operations module 210 that are more time sensitive (e.g., to provide a modification to the digital input as the digital input is received) are performed in the same thread as the input manager 204. Other portions of the input operations module 210, such as portions that generate additional input data, can be performed in a different thread than the input manager 204. This may result in some lag in the input manager 204 acting on the additional input data, but that lag may not be noticeable to a user (e.g., the user may not notice a quarter or half second lag in displaying digital ink on an additional display).

In one or more embodiments, the input data is provided to the input operations module 210 as discussed above, and the most recently sent input data can be operated on by the input operations module 210. This allows the operations on the input data to be reflected by the digital input system 116 as the digital input is being received. Additionally or alternatively, the input operations module 210 can operate on a larger portion of an input rather than just the most recently sent input data, such as the entire digital input. The input data to be operated on can be provided to the input operations module 210 when such operation is desired, or alternatively the input operations module 210 can maintain the input data as it is sent to the input operations module 210. In situations in which a larger portion of the input is operated on, the input operations module 210 provides the operated-on input data to the input manager 204 to display the larger portion of the digital input as operated on.

Operating on a larger portion of an input allows various different behavior. For example, the user can select (e.g., by providing various different inputs, such as wiggling the input device) to have the input data toggle between being operated on and not being operated on (e.g., so that the input can toggle between being freehand input and smooth input along the edge of a stencil). By way of another example, the user can select (e.g., providing various different inputs, such as by wiggling the input device) to have the input data be operated on to be animated, such as shaking or wiggling like a snake or wet noodle.

Additionally, in one or more embodiments, the input operations module 210 can separate an input into multiple digital inputs. As discussed above, a digital input can refer to the movement of the input device or object from being first sensed as providing input (e.g., touching a touchscreen device or a "pen down" event) through the input device or object no longer being sensed as providing input (e.g., the input device being lifted away from the touchscreen device or a "pen up" event). The input operations module 210 can separate a digital input into multiple digital inputs even though the input device or object continues to be sensed as providing input (e.g., is touching the touchscreen device). For example, referring again to FIG. 4, the user provides input using the input device 122, and the illustrated input is a freeform line that passes over the soft stencil 402. The input device 122 remains sensed as providing input (e.g., as touching the touchscreen display 404), but the input operations module 210 separates the digital input as multiple digital inputs (e.g., two digital inputs on the left-hand side of the soft stencil 402, and two digital inputs on the right-hand side of the soft stencil 402) rather than a single digital input. A digital input is thus able to be completed mid-input and a new digital input started (at the time of the mid-input completion or at a later time). In situations in which the digital input is digital ink, digital ink is thus able to be completed mid-stroke and a new digital ink stroke started (at the time of the mid-stroke completion or at a later time). The input operations module 210 notifies the input manager 204 of this separation of the digital input into multiple digital inputs. This notification can take various forms, such as modifying the input data to include an indication that a digital input has ended or begun, sending commands to (e.g., invoking API methods exposed by) the input manager 204 indicating that a digital input has ended or begun, and so forth.

Figure 9:
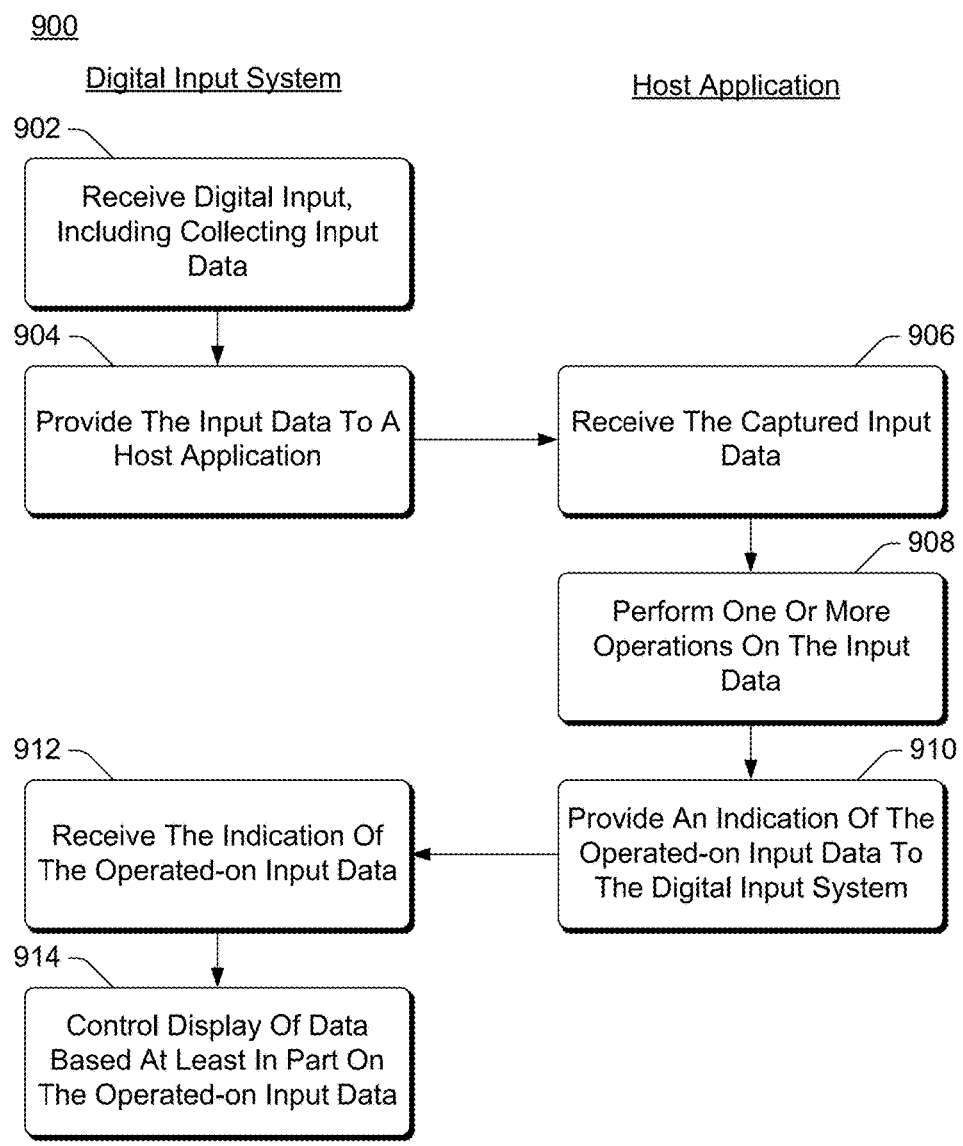
FIG. 9 is a flowchart illustrating an example process for implementing the controlling digital input in accordance with one or more embodiments.

FIG. 9 is a flowchart illustrating an example process 900 for implementing the controlling digital input in accordance with one or more embodiments. Process 900 can be implemented in software, firmware, hardware, or combinations thereof. Acts of process 900 illustrated on the left-hand side of FIG. 9 are carried out by a digital input system, such as the digital input system 116 of FIG. 1 or FIG. 2. Acts of process 900 illustrated on the right-hand side of FIG. 9 are carried out by a host application, such as a host application 106 of FIG. 1 or FIG. 2. Process 900 is shown as a set of acts and is not limited to the order shown for performing the operations of the various acts. Process 900 is an example process for implementing the controlling digital input; additional discussions of implementing the controlling digital input are included herein with reference to different figures.

In process 900, a digital input is received by the digital input system (act 902). The received digital input includes input data for the digital input. The digital input can be input directly to an application and provided to the digital input system, or can be provided to the digital input system that receives the digital input on behalf of the application.

The received input data is provided to a host application (act 904). The host application is, for example, an application that has registered to receive from the digital input system events or messages regarding input data.

The host application receives the captured input data from the digital input system (act 906) and performs one or more operations on the received input data (act 908). These one or more operations can include modifying the input data and/or generating additional input data as discussed above.

An indication of the operated-on input data is provided to the digital input system (act 910). The indication can take various forms as discussed above. For example, the indication can be the modified input data and/or additional input data generated by the host application.

The digital input system receives the indication of the operated-on input data (act 912) and controls display of data based at least in part on the operated-on input data (act 914). This controlling of the display of data can take various forms based on the operated-on input data, such as displaying modified input data, displaying the additional input data as well as the input data collected in act 902, erasing or not displaying the input data, erasing (including point erase) of a modified stroke, and so forth. Additionally or alternatively, various other operations can also be performed, such as saving the data (e.g., the modified input data, the additional input data as well as the input data collected in act 902) and loading the saved data back in later, selecting the data (e.g., the modified input data, the additional input data as well as the input data collected in act 902) for copy/paste operations, and so forth.

The techniques discussed herein thus support various usage scenarios. Digital inputs can be intercepted and changed by the host application prior to the effect of the change being displayed (e.g., prior to any changes in digital ink being displayed). Any aspect of the input data can be changed, including and not limited to coordinates of the input, data reflecting pressure applied by the input device, tilt and/or twist of the input device and so forth. The digital input can also be completed mid-input and a new digital input started, allowing the digital input (and, for example, displayed digital ink) to stop at the edge of a stencil. The host application can also operate on digital input after a display has been changed based on the digital input, allowing the digital input to be modified after a display has been changed based on the digital input (e.g., changing digital ink after the digital ink has been displayed). Replay of a digital input is also supported, allowing the digital input to be mirrored, duplicated, remotely displayed, and so forth. The host application can also operate on the digital input as the digital input is received, allowing, for example, digital ink as operated on by the host application to appear to "flow" from the tip of the input device.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 10:
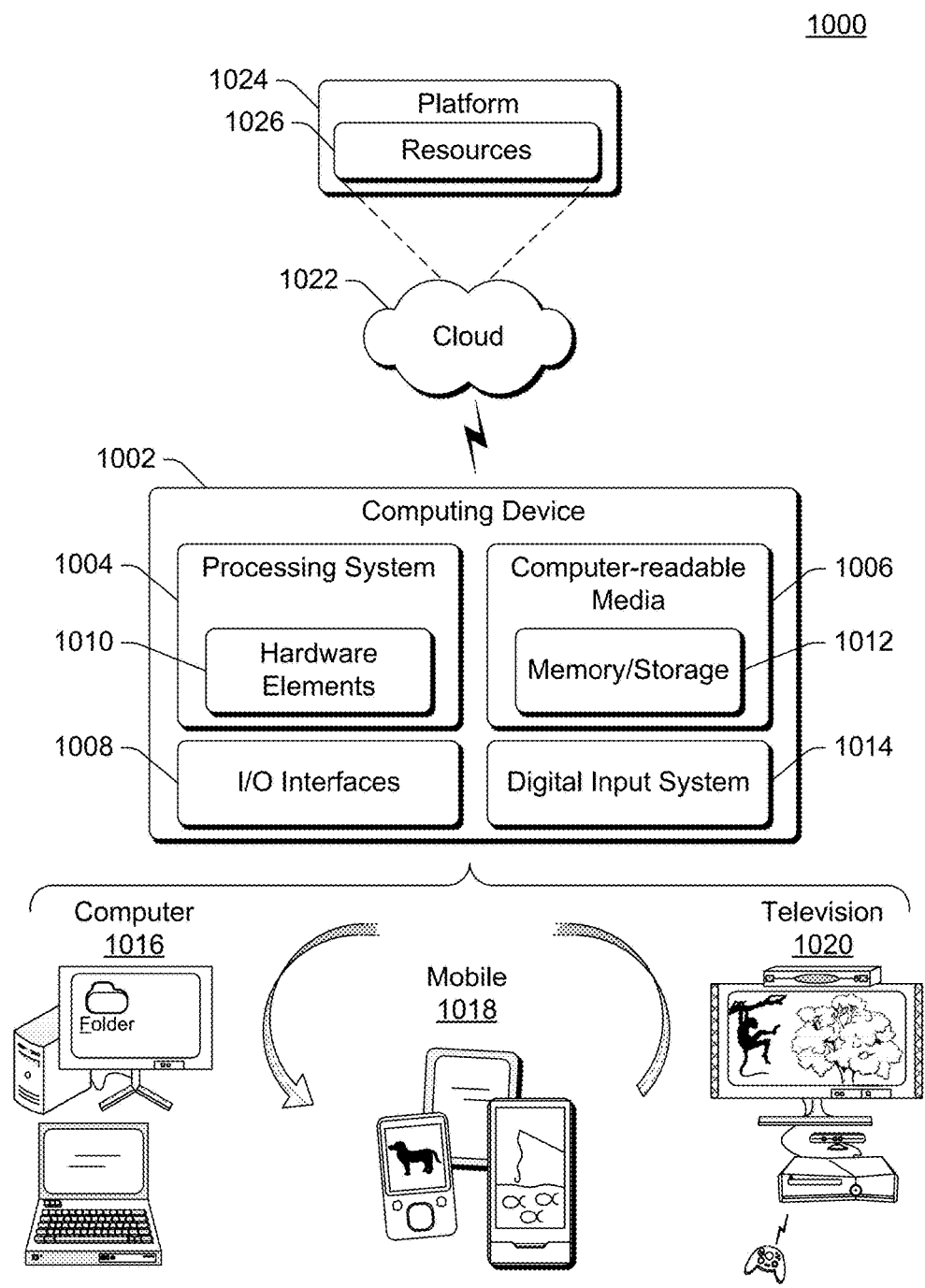
FIG. 10 illustrates an example system that includes an example computing device that is representative of one or more systems and/or devices that may implement the various techniques described herein.

FIG. 10 illustrates an example system generally at 1000 that includes an example computing device 1002 that is representative of one or more systems and/or devices that may implement the various techniques described herein. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O Interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1006 is illustrated as including memory/storage 1012. The memory/storage 1012 represents memory/storage capacity associated with one or more computer-readable media. The memory/storage 1012 may include volatile media (such as random access memory (RAM)) and/or nonvolatile media (such as read only memory (ROM), Flash memory, optical disks, magnetic disks, and so forth). The memory/storage 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

The one or more input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1002 may be configured in a variety of ways as further described below to support user interaction.

The computing device 1002 also includes a digital input system 1014. The digital input system 1014 provides various functionality supporting controlling digital input as discussed above. The digital input system 1014 can be, for example, the digital input system 116 of FIG. 1 or FIG. 2.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 1010 and computer-readable media 1006 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of modules as a module that is executable by the computing device 1002 as software may be achieved at least partially in hardware, e.g., through use of computer-readable storage media and/or hardware elements 1010 of the processing system. The instructions and/or functions may be executable/operable by one or more articles of manufacture (for example, one or more computing devices 1002 and/or processing systems 1004) to implement techniques, modules, and examples described herein.

As further illustrated in FIG. 10, the example system 1000 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1000, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 1002 may assume a variety of different configurations, such as for computer 1016, mobile 1018, and television 1020 uses. Each of these configurations includes devices that may have generally different constructs and capabilities, and thus the computing device 1002 may be configured according to one or more of the different device classes. For instance, the computing device 1002 may be implemented as the computer 1016 class of a device that includes a personal computer, desktop computer, a multi-screen computer, laptop computer, netbook, and so on.

The computing device 1002 may also be implemented as the mobile 1018 class of device that includes mobile devices, such as a mobile phone, portable music player, portable gaming device, a tablet computer, a multi-screen computer, and so on. The computing device 1002 may also be implemented as the television 1020 class of device that includes devices having or connected to generally larger screens in casual viewing environments. These devices include televisions, set-top boxes, gaming consoles, and so on.

The techniques described herein may be supported by these various configurations of the computing device 1002 and are not limited to the specific examples of the techniques described herein. This functionality may also be implemented all or in part through use of a distributed system, such as over a "cloud" 1022 via a platform 1024 as described below.

The cloud 1022 includes and/or is representative of a platform 1024 for resources 1026. The platform 1024 abstracts underlying functionality of hardware (e.g., servers) and software resources of the cloud 1022. The resources 1026 may include applications and/or data that can be utilized while computer processing is executed on servers that are remote from the computing device 1002. Resources 1026 can also include services provided over the Internet and/or through a subscriber network, such as a cellular or Wi-Fi network.

The platform 1024 may abstract resources and functions to connect the computing device 1002 with other computing devices. The platform 1024 may also serve to abstract scaling of resources to provide a corresponding level of scale to encountered demand for the resources 1026 that are implemented via the platform 1024. Accordingly, in an interconnected device embodiment, implementation of functionality described herein may be distributed throughout the system 1000. For example, the functionality may be implemented in part on the computing device 1002 as well as via the platform 1024 that abstracts the functionality of the cloud 1022.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method comprising: receiving, by a digital input system, a digital input, the receiving including collecting input data for the digital input, the input data describing the digital input; providing, by the digital input system, the input data for the digital input to a host application as the digital input is received; receiving, from the host application, an indication of one or more operations the host application performed on the input data; and controlling, by the digital input system as the digital input is received, a display of data based at least in part on the operated-on input data.

Alternatively or in addition to any of the above described methods, any one or combination of: the digital input comprising a digital ink input, the one or more operations including modifying the input data, and the controlling comprising displaying a digital ink stroke using the modified input data rather than the collected input data; the input data including coordinates of an input device where the digital input occurs; the host application being implemented in a computing device, and the digital input system being implemented as a program in the computing device separate from the host application' the one or more operations including modifying the input data, and the controlling comprising controlling the display of data using the modified input data rather than the collected input data; the digital input comprising a digital ink input, the one or more operations including generating additional input data and providing the additional input data to the digital input system, and the controlling comprising displaying the additional input data contemporaneously with displaying the collected input data; the controlling further comprising displaying the additional digital input data and the collected input data on different display devices; the one or more operations including separating the digital input into multiple digital inputs; the method further comprising performing, by the host application, an additional one or more operations on the input data after the input data is received, and controlling, by the digital input system after the input data is received, the display of data based at least in part on the additional operated-on input data.

A computing device comprising: one or more processors; and a computer-readable storage medium having stored thereon multiple instructions that implement a digital input system and that, responsive to execution by the one or more processors, cause the one or more processors to: collect input data for a digital input that is input to the digital input system, the input data describing the digital input; provide the input data to a host application as the digital input is received; receive, from the host application, an indication of one or more operations performed on the input data by the host application; and control display of data based on the one or more operations performed on the input data by the host application.

Alternatively or in addition to any of the above described computing devices, any one or combination of: the host application being implemented in the computing device as a program separate from the digital input system; the host application operating on the digital input by modifying the input data, and the controlling comprising controlling the display of data using the operated-on input data; the host application operating on the digital input by separating the digital input into multiple digital inputs; the host application operating on the digital input by generating additional input data, and the controlling further comprising controlling the display of data based on the input data as well as the additional input data.

A computing device comprising: an input data collection module comprising instructions configured to collect input data for a digital input that is input to the computing device; an input manager comprising instructions configured to provide the input data to a host application as the digital input is received, and to receive from the host application an indication of the digital input as operated on by the host application; and a data display module comprising instructions configured to communicate with the input manager and to display data based on the digital input as operated on by the host application.

Alternatively or in addition to any of the above described computing devices, any one or combination of: the input data comprising digital ink stroke data, the host application having operated on the digital ink stroke data by modifying the digital ink stroke data, and the data display module comprising instructions further configured to communicate with the input manager to display digital ink based on the modified digital ink stroke data; the input data including coordinates of an input device where a digital input occurs; the host application being implemented in the computing device, and the digital input system being implemented as a program in the computing device separate from the host application; the host application operating on the digital input by modifying the input data, and the data display module comprising instructions further configured to communicate with the input manager to display data based on the modified digital input data; the host application operating on the digital input by separating the digital input into multiple digital inputs.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving, by a digital input system, a digital input, the receiving including collecting input data for the digital input, the input data describing the digital input;
   providing, by the digital input system, the input data for the digital input to a host application as the digital input is received;
   receiving, from the host application, an indication of one or more operations the host application performed on the input data to modify the input data; and
   controlling, by the digital input system, a display of the modified input data, wherein the modifying and displaying the modified input data occurs in real-time as the digital input is received.

2. The method of claim 1, the digital input comprising a digital ink input, and the controlling comprising displaying a digital ink stroke using the modified input data rather than the collected input data.

3. The method of claim 1, the input data including coordinates of an input device where the digital input occurs.

4. The method of claim 1, the host application being implemented in a computing device, and the digital input system being implemented as a program in the computing device separate from the host application.

5. The method of claim 1, the controlling comprising controlling the display of the modified input data rather than the collected input data.

6. The method of claim 1, wherein the controlling further comprises displaying the modified input data contemporaneously with displaying the collected input data.

7. The method of claim 6, the controlling further comprising displaying the modified input data and the collected input data on different display devices.

8. The method of claim 1, the one or more operations including separating the digital input into multiple digital inputs.

9. The method of claim 1, further comprising:
   performing, by the host application, an additional one or more operations on the input data after the input data is received; and
   controlling, by the digital input system after the input data is received, the display of data based at least in part on the additional operated-on input data.

10. A computing device comprising:
    one or more processors; and
    a computer-readable storage medium having stored thereon multiple instructions that implement a digital input system and that, responsive to execution by the one or more processors, cause the one or more processors to:
    collect input data for a digital input that is input to the digital input system, the input data describing the digital input;
    provide the input data to a host application as the digital input is received;
    receive, from the host application, an indication of one or more operations performed on the input data to modify the input data by the host application; and
    control display of the modified input data in real time based on the one or more operations performed on the input data by the host application, the controlling comprising displaying the modified input data without a prior display of the collected input data corresponding to the digital input.

11. The computing device of claim 10, the host application being implemented in the computing device as a program separate from the digital input system.

12. The computing device of claim 10, the host application operating on the digital input by separating the digital input into multiple digital inputs.

13. The computing device of claim 10, the host application operating on the digital input by generating additional input data, and the controlling further comprising controlling the display of the modified input data along with the additional input data.

14. A computing device comprising:
    an input data collection module comprising instructions configured to collect input data for a digital input that is input to the computing device;
    an input manager comprising instructions configured to provide the input data to a host application as the digital input is received, and to receive from the host application an indication of the digital input as operated on by the host application to modify the input data; and
    a data display module comprising instructions configured to communicate with the input manager and to display the modified input data in real time based on the digital input as operated on by the host application, the displaying the modified input data occurring without a prior display of the collected input data corresponding to the digital input.

15. The computing device of claim 14, the input data comprising digital ink stroke data, the host application having operated on the digital ink stroke data by modifying the digital ink stroke data, and the data display module comprising instructions further configured to communicate with the input manager to display digital ink based on the modified digital ink stroke data.

16. The computing device of claim 14, the input data including coordinates of an input device where a digital input occurs.

17. The computing device of claim 15, the host application being implemented in the computing device, and the digital input system being implemented as a program in the computing device separate from the host application.

18. The computing device of claim 14, the host application operating on the digital input by separating the digital input into multiple digital inputs.

19. The method of claim 1, wherein the controlling comprises displaying the modified input data without a prior display of the collected input data corresponding to the digital input.

* * * * *